United States Patent Office 2,844,563
Patented July 22, 1958

2,844,563

DECOLORIZATION OF POLYVINYL ALCOHOL

Edward P. Czerwin, Niagara Falls, N. Y., assignor to E. I. du Pont de Nemours and Company, Wilmington, Del., a corporation of Delaware No Drawing. Application March 30, 1956
Serial No. 574,978

4 Claims. (Cl. 260—45.9)

This invention relates to the decolorization of polyvinyl alcohol produced by the alcoholysis of polyvinyl acetate.

The alcoholysis of polyvinyl acetate is generally accompanied by the formation of small amounts of colored impurities or impurities which easily convert to colored compounds. This is particularly so when the alcoholysis is catalyzed by alkaline catalysts. Such colored products or products containing color formers are not suitable for certain applications, especially in the production of films where absence of color is essential. Another required property of polyvinyl alcohol and especially of films made therefrom is that no bloom or efflorescence shall form on the exposed surfaces due to the low solubility tolerance in the polymer exhibited by many possible additives particularly of the inorganic class. Such bloom is especially deleterious where the optical properties are significant. The bloom may also interfere with the bonding properties of film made from polyvinyl alcohol when it is used as an interlayer or a bonding agent.

It is, therefore, the primary object of this invention to eliminate or greatly reduce the color or color formers from polyvinyl alcohol. It is another object to provide a simple additive which will decolorize an aqueous solution of polyvinyl alcohol and the resultant film without leading to the formation of an efflorescence thereon. Other objects will be apparent from the description of the invention.

These objectives are accomplished by the addition of small quantities of formamidine sulfinic acid to polyvinyl alcohol. Formamidine sulfinic acid is sometimes referred to as thiourea dioxide.

I have discovered that the problem of producing polyvinyl alcohol capable of making films having low color and avoiding undesirable bloom or efflorescence can be easily solved by the addition of small amounts of formamidine sulfinic acid. This acid is a powerful reducing agent which has the property of reducing the coloring agents in the polymer to colorless materials. The amount of formamidine sulfinic acid necessary to decolorize polyvinyl alcohol is relatively quite small. Furthermore, the oxidation products of formamidine sulfinic acid are themselves organic substances which are sufficiently soluble in the solid resin so that efflorescence is greatly minimized.

By way of example, a 10% solution by weight of a commercial grade of polyvinyl alcohol (made by completely hydrolyzing polyvinyl acetate and having a high viscosity) in water was made by stirring and heating for an hour at 90° C. On cooling this solution to room temperature it had an APHA color of 200-300 and was quite yellow. (APHA is a standard color measure for water in which the lower numbers approach water whiteness as developed by the American Public Health Association.) By contrast, a solution prepared in the same manner but with the addition of 0.2% by weight of formamidine sulfinic acid related to the polyvinyl alcohol gave a solution having an APHA color of 20-50 and was practically water white. Films prepared from the untreated solution showed distinct color whereas film prepared from the formamidine sulfinic acid treated solution showed practically no color.

To produce polyvinyl alcohol of satisfactorily low color formamidine sulfinic acid may be added to the "hot solution," i. e., the alcoholysis mixture after the alcoholysis reaction. If preferred, it may be added at any stage between the alcoholysis and the final use of the product such as the casting solution from which the film is produced.

Effective decolorization may be achieved with as little as 0.05% by weight of formamidine sulfinic acid. In general, the amount of this agent required will depend upon the amount or degree of decolorization required and this may in turn depend upon the amount and nature of the coloring matter present in the polyvinyl alcohol as produced. The preferred range of formamidine sulfinic acid to be used will lie between about 0.05% and about 0.5% by weight of the resin.

I claim:

1. Polyvinyl alcohol color stabilized with between about 0.05 and 0.5% by weight of formamidine sulfinic acid based on the weight of the polyvinyl alcohol.

2. An aqueous solution of polyvinyl alcohol color stabilized with between about 0.05 and 0.5% by weight of formamidine sulfinic acid based on the weight of the polyvinyl alcohol.

3. A film of polyvinyl alcohol containing between about 0.05 and 0.5% by weight of formamidine sulfinic acid.

4. The process comprising treating an aqueous solution of polyvinyl alcohol with between about 0.05 and 0.5% by weight of said alcohol of formamidine sulfinic acid.

References Cited in the file of this patent

UNITED STATES PATENTS 2,199,992    Hale  ---------------- May 7, 1940

FOREIGN PATENTS 586,796    Great Britain  ----------- Apr. 1, 1947